United States Patent [19]

Nishihara et al.

[11] Patent Number: 4,929,507

[45] Date of Patent: * May 29, 1990

[54] HEAT-RESISTANT PAINT COMPRISING POLYMETALLOCARBOSILANE

[75] Inventors: Yoshio Nishihara, Ube; Noriyuki Isobe, Kyoto; Satoshi Kotera, Ube, all of Japan

[73] Assignee: Ube Industries, Ltd., Ube, Japan

[*] Notice: The portion of the term of this patent subsequent to Feb. 28, 2006 has been disclaimed.

[21] Appl. No.: 172,962

[22] Filed: Mar. 23, 1988

Related U.S. Application Data

[63] Continuation of Ser. No. 900,381, Aug. 26, 1986, abandoned.

[30] Foreign Application Priority Data

Aug. 27, 1985 [JP] Japan .................. 60-186591
Sep. 4, 1985 [JP] Japan .................. 60-193786

[51] Int. Cl.$^5$ .................. C08K 3/00; C08K 3/14; C08K 3/38
[52] U.S. Cl. .................. 428/447; 428/450; 524/404; 524/405; 524/406; 524/407; 524/408; 524/409; 524/413; 524/417; 524/424; 524/428; 524/430; 525/475; 525/477; 528/10; 528/25; 528/33
[58] Field of Search .................. 525/475, 477; 528/10, 528/33, 25; 428/447, 450; 524/404, 405, 406, 407, 408, 409, 413, 417, 424, 428, 430, 451, 506

[56] References Cited

U.S. PATENT DOCUMENTS

| | | | |
|---|---|---|---|
| 4,234,340 | 11/1980 | Pellico | 106/15.05 |
| 4,267,210 | 5/1981 | Yajima | 428/447 |
| 4,359,559 | 11/1982 | Yajima | 525/475 |
| 4,585,822 | 4/1986 | Streusand | 524/588 |
| 4,808,659 | 2/1989 | Nishihara | 525/475 |

FOREIGN PATENT DOCUMENTS 123146  9/1979  Japan .

OTHER PUBLICATIONS

W. M. Morgans, "Outlines of Paint Technology", 1982, pp. 58–61, 77, 234–235.
World Intellectual Property Organization, *International Patent Classification*, 1984, vol. 3, Section C, p. 113.

Primary Examiner—John C. Bleutge
Assistant Examiner—David Buttner
Attorney, Agent, or Firm—Sherman and Shalloway

[57] ABSTRACT

A heat-resistant paint comprising a dispersion or solution of a polymetallocarbosilane and an inorganic filler in an organic solvent,
wherein said polymetallocarbosilane is an organometallic polymer having a number average molecular weight of 400 to 50,000 comprising
(A) carbosilane bond units of the formula

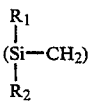

wherein $R_1$ and $R_2$ may be identical or different and each represents a lower alkyl group, phenyl group or a hydrogen atom, and
(B) metalloxane bond units of the formula

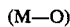

wherein M represents at least one element selected from the group consisting of Ti, Zr, Cr and Mo,
wherein said inorganic filler is at least one material selected from the group consisting of oxides, borates, phosphates, silicates, silicides, borides, nitrides and carbides; and
wherein said inorganic filler is present in an amount of 10 to 900 parts by weight per 100 parts by weight of said polymetallocarbosilane.

8 Claims, No Drawings

HEAT-RESISTANT PAINT COMPRISING POLYMETALLOCARBOSILANE

This application is a continuation of application Ser. No. 900,381, filed Aug. 26, 1986, now abandoned.

BACKGROUND OF THE INVENTION

1. Field of the Invention

This invention relates to a novel heat-resistant paint containing a polymetallocarbosilane, and more specifically, to a novel heat-resistant paint comprising a polymetallocarbosilane and a filler with or without a silicone resin.

2. Description of the Prior Art

Paints comprising organopolysiloxane as a vehicle and various pigments are known as heat-resistant paints which prevent corrosion and degradation of metallic and nonmetallic substrates at high temperatures. These organopolysiloxane-type paints have better heat resistance than known paints comprising organic polymers such as polyesters and polyimides as vehicles, but in an air atmosphere at high temperatures exceeding 400° C., coated films prepared from these organopolysiloxane-type paints undergo peeling from the substrates.

With an advance in industry, there has been an increasing demand for coating agents which can prevent oxidation and corrosion of metallic or nonmetallic substrates which are exposed to high temperatures above 1000° C., for example aircraft component parts, and steel-making furnaces or metal smelting furnaces.

Japanese Patent Publication No. 12746/1984 discloses a process for producing a heat-resistant metallic material which comprises coating a metallic material with polycarbosilane having carbon and silicon as skeletal components and containing small amounts of metal elements, and firing the coated material at 800° to 2000° C. in a nonoxidizing atmosphere to convert polycarbosilane into silicon carbide. Japanese Laid-Open Patent Publication No. 84370/1980 discloses a process for obtaining a heat-resistant coated film, which comprises coating a metallic or nonmetallic material with a coating composition comprising a semiinorganic compound containing polycarbosilane and a ceramic or metal powder, and then baking the coating by heating the coated material at 400° to 2,000° C. in a nonoxidizing atmosphere.

Since the ratio of polycarbosilane which remains after firing at 1,000° C. (in air) is about 30% by weight, high volumetric shrinkage occurs as a result of thermal decomposition of polycarbosilane during baking, and the adhesion of the baked coated film to the substrate becomes insufficient. When the baking is carried out in an oxidizing atmosphere, for example air, the coated film mostly peels from the substrate. Furthermore, the heat resistance temperature of the coated film formed is about 400° C. in air. This heat resistance temperature is not much different from that of a conventional organopolysiloxane-type paint.

SUMMARY OF THE INVENTION

It is an object of this invention to provide a heat-resistant paint which can prevent oxidation, corrosion and degradation of a metallic or nonmetallic material even in an air atmosphere at high temperatures.

Another object of this invention is to provide a heat-resistant paint which can be baked by heating in an oxidizing atmosphere such as air.

Still another object of this invention is to provide a heat-resistant paint which even when baked by heating in air, has a high ratio of remaining after firing, a low volumetric shrinkage and excellent adhesion to a substrate.

The present invention provides a heat-resistant paint comprising a solution or dispersion of a polymetallocarbosilane and an inorganic filler in an organic solvent.

The present invention also provides a heat-resistant paint comprising a solution or dispersion of polymetallocarbosilane, an inorganic filler and a silicone resin in an organic solvent.

DETAILED DESCRIPTION OF THE INVENTION

The polymetallocarbosilane used in this invention is an organometallic polymer having a number average molecular weight of 400 to 50,000 comprising
(A) carbosilane bond units of the formula

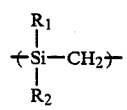

wherein $R_1$ and $R_2$ may be identical or different and each represents a lower alkyl group, a phenyl group or a hydrogen atom,
and (B) metalloxane bond units of the formula

wherein M represents at least one element selected from the group consisting of Ti, Zr, Cr and Mo, and optionally at least a part of each of the above elements has at least one lower alkoxy group or a phenoxy group as a side-chain group,
in which the bond units (A) and (B) are bonded at random in the main-chain skeleton, and/or at least one of the silicon atoms of the bond units (A) is bonded to each of the above elements of the bond units (B) via an oxygen atom, whereby the polycarbosilane portion obtained by chaining of the bond units (A) is crosslinked with the bond units (B), and in which the ratio of the total number of the bond units (A) to the total number of bond units (B) is in the range of from 1:1 to 10:1.

U.S. Pat. No. 4,359,559 shows that the polymetallocarbosilane is a high-molecular-weight copolymer derived from polycarbosilane whose main-chain skeleton is composed mainly of the structural unit $\text{-Si-CH}_2\text{-}$ and a metal alkoxide having the bond unit $\text{-M-O-}$, and fibers spun obtained from this copolymer have better heat resistance than fibers obtained from conventional polycarbosilane polymers.

The inorganic filler used in this invention is at least one material selected from the group consisting of oxides, borates, phosphates, silicates, silicides, borides, nitrides and carbides. Specific examples include oxides, carbides, nitrides, silicides and borides of boron, magnesium, aluminum, silicon, calcium, titanium, vanadium, chromium, manganese, zinc, zirconium, molybdenum, cadmium, tin, antimony, barium, tungsten, lead and bismuth; and borates, phosphates and silicates of lithium, sodium, potassium, magnesium, calcium and zinc.

These inorganic fillers may be used singly or in combination.

The silicone resin optionally used in this invention is at least one resin selected from the group consisting of organopolysiloxanes, silicone oils, silicon varnishes and silicone rubbers.

Investigations of the present inventors have shown that a coated film obtained by coating a paint comprising the polymetallocarbosilane and the inorganic filler with or without the silicone resin on a metallic or nonmetallic substrate, and baking the coating at 200° to 2,000° C. in an oxidizing or nonoxidizing atmosphere has better heat resistance and adhesion to the metallic or nonmetallic substrate than a coated film of the polycarbosilane alone.

When the polymetallocarbosilane used in this invention is heat-treated at 1,000° C. in an air atmosphere for at least 10 hours, its weight loss upon heating is only 10 to 15% by weight. For this reason, shrinkage and cracking owing to the weight loss of the baked paint film do not appreciably occur, and the baked film becomes dense.

Since the polymetallocarbosilane contains metals, when it is baked onto the surface of a metallic substrate, a metal carbide or metal oxide in ultrafine particles forms a firm bond between the metallic substrate and the coated film. As a result, a dense protective film layer is formed which is not peeled even at temperatures above 1,000° C. Likewise, the ultrafine particles mentioned above function as a binder on the surface of a ceramic or glass substrate and are conducive to the formation of a firmly bonded paint film.

Addition of the inorganic filler and the silicone resin to the polymetallocarbosilane gives a coated film which has higher heat resistance and flexibility than a coated film of the polymetallocarbosilane alone, and adheres to a substrate more firmly than the polymetallocarbosilane film.

The inorganic filler is added in an amount of 10 to 900 parts by weight, preferably 50 to 500 parts by weight, per 100 parts by weight of the polymetallocarbosilane. If the amount of the inorganic filler is less than 10 parts by weight, the resulting baked paint film has poor adhesion to the substrate. On the other hand, if it exceeds 900 parts by weight, the flexibility of the coated film is reduced.

The silicone resin is added in an amount of 10 to 900 parts by weight, preferably 50 to 500 parts by weight, per 100 parts by weight of polymetallocarbosilane. If the amount of the silicone resin is less than 10 parts by weight, the flexibility of the baked paint film becomes poor. If it exceeds 900 parts by weight, the heat resistance of the coated film at high temperatures above the decomposition temperature of the silicone resin is impaired.

The paint of this invention is obtained by dissolving or dispersing the polymetallocarbosilane and inorganic filler with or without the silicone resin in a suitable solvent such as benzene, toluene and xylene.

The paint is applied to a metallic substrate or a nonmetallic substrate such as glass, ceramics and refractory bricks by various known methods such as brush coating, roll coating, dipping, or coating by means of a spray gun, and then baked.

Desirably, the amount of coating is generally 20 to 100 g/m$^2$. If it is below 20 g/m$^2$, pinholes occur to decrease corrosion resistance. On the other hand, if it exceeds 100 g/m$^2$, cracking tends to occur in the film during baking.

The baking temperature is preferably at least 150° C. If the coated substrate is to be placed in an environment kept at a temperature of at least 150° C. after coating, it is not particularly necessary to provide a baking step. If the baking temperature is below 150° C., the resulting coated film has low strength and poor hardness and impact strength.

The resulting baked paint film has excellent heat resistance and at the same time shows good corrosion resistance, impact strength and flexibility.

The following examples illustrate the present invention more specifically. All parts and percentages in these examples are by weight unless otherwise specified.

REFERENTIAL EXAMPLE 1

A 5-liter three-necked flask was charged with 2.5 liters of anhydrous xylene and 400 g of sodium, and the mixture was heated in a stream of nitrogen gas to the boiling point of xylene. One liter of dimethyldichlorosilane was added dropwise over 1 hour. After the addition, the mixture was heated under reflux for 10 hours to form a precipitate. The precipitate was collected by filtration, and washed with methanol and then with water to give 420 g of polydimethylsilane as a white powder.

The resulting polydimethylsilane (400 g) was charged into a 3 liter three-necked flask equipped with a gas introducing tube, a stirrer, a condenser and a distillation tube, and with stirring, the compound was heat-treated at 420° C. in a stream of nitrogen (50 ml/min.) to obtain 350 g of a colorless, transparent, slightly viscous liquid at a distillate receiver. By a vapor pressure osmotic method (VPO), this liquid was found to have a number average molecular weight of 470.

Measurement of the far infrared absorption of this substance led to the determination that this substance is an organosilicon polymer composed mainly of $-$Si$-$CH$_2-$ bond units and $-$(Si$-$Si$)-$ bond units in which the side chain of silicon contains a hydrogen atom and a methyl group.

REFERENTIAL EXAMPLE 2

Xylene (400 ml) was added to a mixture of 40 g of the organosilicon polymer obtained in Referential Example 1 and 20 g of titanium tetraisopropoxide to form a uniform solution. The solution was refluxed at 130° C. for 1 hour with stirring in an atmosphere of nitrogen gas. After the refluxing reaction, the temperature was further raised to distill the xylene solvent. The residue was maintained at 300° C. for 10 hours to give an organometallic crosslinked polymer containing silicon and titanium. The polymer had a number average molecular weight, measured by the VPO method, of 1,165.

Analysis by gel permeation chromatography and infrared absorption spectroscopy showed that the polymer obtained is polytitanocarbosilane resulting from partial disappearance of the Si$-$H bonds in the organosilicon polymer and bonding of the silicon atoms in this portion with the titanium atom through the oxygen atom of titanium tetraisopropoxide whereby partly the $-$O$-$Ti(OC$_3$H$_7$)$_3$ group was attached to the side chain of the organosilicon polymer and partly, the organosilicon polymer was cross-linked through $-$(Ti$-$O$)-$ linkages via an oxygen atom. The reaction conversion and/or the crosslinking ratio of the polymer at the Si$-$H bond portion was 44.5%. It was further determined that the ratio of the total number of the $-$Si$-$CH$_2-$ bond units and $-$(Si$-$Si$)-$ bond units to that of the $-$O$-$Ti(OC$_3$H$_7$)$_3$ and $-$Ti$-$O-bond units in the organosilicon polymer portion of this polymer was about 6:1.

The reaction product was dissolved in xylene to form a solution having a solids content of 50%.

REFERENTIAL EXAMPLE 3

Polyzirconocarbosilane, polychromocarbosilane and polymolybdenocarbosilane were obtained respectively in the same way as in Referential Example 2 except that zirconium tetraisopropoxide, chromium trimethoxide and molybdenum triphenoxide were used respectively instead of titanium tetraisopropoxide as one of the starting materials in Referential Example 2. The reaction conditions and the operating method were subtantially the same as those used in Referential Example 2.

EXAMPLE 1

Fifty parts of the 50% xylene solution of polytitanocarbosilane obtained in Referential Example 2 was mixed with 50 parts of talc to prepare a heat-resistant paint. The paint was coated to a thickness of about 50 microns on a 1 mm-thick stainless steel sheet (SUS 304) by a bar coater, and then baked in an oven at 200° C. for 1 hour.

The coated steel sheet was heated in an oven at 1,000° C. for 10 hours, withdrawn from the oven, and gradually cooled in air. No peeling or cracking of the coated film occurred, and the coated film showed good adhesion to the metallic substrate.

EXAMPLE 2

Forty parts of a 50% xylene solution of the polyzirconocarbosilane obtained in Referential Example 3 was mixed with 60 parts of tungsten trioxide to prepare a heat-resistant paint.

A 0.5 mm-thick titanium plate was dipped in the paint, and the coated film was baked by placing the coated plate in an oven at 200° C. for 1 hour.

The coated titanium plate was then subjected three times to a heat cycle test (1 hour at room temperature and then 1 hour in an oven at 1,000° C.). No peeling or cracking of the coated film occurred.

EXAMPLE 3

Sixty parts of a 50% xylene solution of the polymolybdenocarbosilane obtained in Referential Example 3 was mixed with 40 parts of aluminum oxide to prepare a heat-resistant paint. The paint was brush-coated on a 1 mm-thick stainless steel sheet (SUS 304) and then baked in an oven at 250° C. for 1 hour.

The coated steel sheet was then heated in an oven at 1,000° C. for 10 hours, and then gradually cooled in air. The coated steel sheet was then bent at a radius of curvature of 20R, but no peeling of the coated film occurred.

EXAMPLE 4

Thirty parts of a 50% xylene solution of the polychromocarbosilane obtained in Referential Example 3 was mixed with 70 parts of talc to prepare a heat-resistant paint.

The paint was coated to a thickness of about 30 microns on a 1 mm-thick stainless steel sheet (SUS 304), and then baked in an oven at 200° C. for 1 hour.

The coated steel sheet was heated in an oven at 1,000° C. for 10 hours, withdrawn from the oven, and gradually cooled in air. No peeling of the coated film was observed.

COMPARATIVE EXAMPLE 1

The 50% xylene solution of polytitanocarbosilane obtained in Referential Example 2 was coated to a thickness of about 50 microns on a 1 mm-thick stainless steel sheet (SUS 304) by a bar coater, and baked in an oven at 200° C. for 1 hour.

The coated steel sheet was then heated in an oven at 1,000° C. for 10 hours, withdrawn from the oven, and then gradually cooled in air. Peeling of the coated film occurred during cooling.

COMPARATIVE EXAMPLE 2

Five parts of a 50% xylene solution of the polyzirconocarbosilane obtained in Referential Example 3 was mixed with 95 parts of silicon dioxide to prepare a paint. A 0.5 mm-thick titanium plate was dipped in the paint, and the coated film was then baked in an oven at 200° C. for 1 hour.

The coated plate was then heated in an oven at 1,000° C. for 10 hours, withdrawn from the oven, and then gradually cooled in air. When the coated plate was bent at a radius of curvature of 20R, the coated film was peeled from the substrate plate.

EXAMPLE 5

Thirty parts of the 50% xylene solution of polytitanocarbosilane obtained in Referential Example 2, 30 parts of a 50% xylene solution of methylphenylsilicone oil (TSR-116, a product of Toshiba Silicone Co., Ltd.) and 40 parts of titanium dioxide were mixed to prepare a heat-resistant paint. The paint was coated to a thickness of about 50 microns on a 1 mm-thick stainless steel sheet (SUS 304) by a bar coater, and then baked in an oven at 200° C. for 1 hour. The coated steel sheet was then heated in an oven at 1,000° C. for 96 hours, withdrawn from the oven, and gradually cooled in air.

To evaluate the adhesion of the coated film to the substrate, 11 cuts reaching the substrate were provided at 2 mm intervals on the coated film both longitudinally and laterally to provide 100 squares. An adhesive cellophane tape was applied to the cut surface of the coated film, and abruptly peeled. The number of remaining squares on the coated film was examined, and found to be 95 out of 100 which shows very good adhesion.

EXAMPLE 6

Forty parts of a 50% xylene solution of the polyzirconocarbosilane obtained in Referential Example 3, 40 parts of dimethyl silicone oil (TSF 431, a product of Toshiba Silicone Co., Ltd.) and 20 parts of potassium borate were mixed, and 50 parts, per 100 parts of the mixture, of xylene was added to prepare a heat-resistant paint. A 0.5 mm-thick titanium plate was dipped in the paint, and the coated film was baked in an oven at 200° C. for 1 hour.

The coated titanium plate was then subjected to a heat cycle test (1 hour at room temperature and 1 hour in an oven at 1,000° C.) ten times. There was no change in the appearance of the coated film, and no peeling of the coated film from the substrate was observed.

EXAMPLE 7

Sixty parts of a 50% xylene solution of the polymolybdenocarbosilane obtained in Referential Example 3, 20 parts of methylphenylsilicone oil (TSF-451, a product of Toshiba Silicone Co., Ltd.) and 20 parts of talc were mixed to prepare a heat-resistant paint. The paint was brush-coated on a 1 mm-thick stainless steel sheet (SUS 304) and baked in an oven at 250° C. for 1 hour.

The coated sheet was heated in an oven at 1,000° C. for 96 hours, and then gradually cooled in air. The adhesion of the coated film was evaluated by the same method as in Example 5. The number of remaining squares was 92 out of 100, showing very good adhesion.

EXAMPLE 8

A 50% xylene solution of the polychromocarbosilane obtained in Referential Example 3, a 50% xylene solution of methylphenyl silicone varnish (TSR-116, a product of Toshiba Silicone Co., Ltd.), and 30 parts of boron oxide, were mixed to prepare a heat-resistant paint. The paint was coated to a thickness of 40 microns on a 1 mm-thick nickel plate by a bar coater, and baked in an oven at 200° C. for 1 hour.

The coated nickel plate was heated in an oven at 1,000° C. for 3 hours, and then gradually cooled in air. The adhesion of the coated film was evaluated by the same method as in Example 5. The number of remaining squares was 95 out of 100.

EXAMPLE 9

Eighty parts of the 50% xylene solution of polytitanocarbosilane obtained in Referential Example 2, 10 parts of a 50% xylene solution of methylphenyl silicone varnish (TSR-116, a product of Toshiba Silicone Co., Ltd.) and 10 parts of tin dioxide were mixed to prepare a heat-resistant paint. The paint was roller-coated on a 0.5 mm-thick titanium plate, and baked in an oven at 200° C. for 1 hour.

The coated titanium plate was subjected to a heat cycle test (1 hour at room temperature and then 1 hour at 1,000° C.) five times. No change in the appearance of the coated film nor peeling of the coated film from the substrate was observed.

COMPARATIVE EXAMPLE 3

Thirty parts of a 50% xylene solution of the polycarbosilane obtained in Referential Example 1, 30 parts of a 50% xylene solution of methylphenylsilicone varnish (TSR-116, a product of Toshiba Silicone Co., Ltd.) and 40 parts of an aluminum oxide powder were mixed to prepare a paint. The paint was coated to a thickness of about 50 microns on a 1 mm-thick stainless steel sheet, and then baked in an oven at 200° C. for 1 hour.

The coated steel sheet was heated in an oven at 600° C. for 10 hours, and then gradually cooled in air. The adhesion of the coated film was evaluated by the same method as in Example 5. The number of remaining squares was 58 out of 100.

COMPARATIVE EXAMPLE 4

Fifty parts of the 50% xylene solution of polytitanocarbosilane obtained in Referential Example 2 and 50 parts of a 50% xylene solution of methylphenylsilicone varnish (TRS-116, a product of Toshiba Silicone Co., Ltd.) were mixed to prepare a paint. The paint was coated to a thickness of about 50 microns on a 1 mm-thick stainless steel by a bar coater, and baked in an oven at 200° C. for 1 hour.

The coated steel sheet was heated in an oven at 1,000° C. for 1 hour, and then allowed to cool in air. The adhesion of the coated film was evaluated by the same method as in Example 5. The number of remaining squares was 62 out of 100.

COMPARATIVE EXAMPLE 5

Thirty parts of a 50% xylene solution of the polycarbosilane obtained in Referential Example 1 was mixed with 70 parts of carborundum powder to prepare a paint. A 0.5 mm-thick titanium plate was dipped in the paint, and the coated film was baked in an oven at 200° C. for 1 hour.

The coated titanium plate was subjected to a heat cycle test (1 hour at room temperature and then 1 hour in an oven at 1,000° C.) ten times. The coated film partly peeled, and cracking was seen to occur.

What we claim is:

1. A heat-resistant paint comprising a dispersion or solution of a polymetallocarbosilane and an inorganic filter in an organic solvent,
wherein said polymetallocarbosilane is an organometallic polymer having a number average molecular weight of 400 to 50,000 comprising
(A) carbosilane bond units of the formula

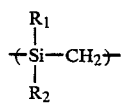

wherein $R_1$ and $R_2$ may be identical or different and each represents a lower alkyl group, a phenyl group or a hydrogen atom, and
(B) metalloxane bond units of the formula

wherein M represents at least one element selected from the group consisting of Ti, Zr, Cr and Mo, and optionally at least a part of each of the above elements has at least one lower alkoxy group or a phenoxy group as a side-chain group, in which the bond units (A) and (B) are bonded at random in the main-chain skeleton, and/or at least one of the silicon atoms of the bond units (A) is bonded to each of the above elements of the bond units (B) via an oxygen atom, whereby the polycarbosilane portion obtained by chaining of the bond units (A) is crosslinked with the bond units (B), and in which the ratio of the total number of the bond units (A) to the total number of bond units (B) is in the range of from 1:1 to 10:1;
wherein said inorganic filter is at least one material selected from the group consisting of oxides, borates, phosphates, silicates, silicides, borides, nitrides and carbides: and
wherein said inorganic filler is present is an amount of 10 to 900 parts by weight per 100 parts by weight of said polymetallocarbosilane.

2. The heat-resistant point of claim 1 which further comprises a silicone resin.

3. The heat-resistant paint of claim 2 wherein the silicone resin is selected from the group consisting of silicone oils, silicone varnishes and silicone rubbers.

4. The heat-resistant paint of claim 2 which comprises 100 parts by weight of the polymetallocarbosilane, 10 to 900 parts by weight of the silicone resin and 10 to 900 parts by weight of the inorganic filler.

5. The heat-resistant paint of claim 2 which comprises 100 parts by weight of the polymetallocarbosilane, 50 to 500 parts by weight of the inorganic filler and 50 to 500 parts by weight of the silicone resin.

6. The heat-resistant paint of claim 5 wherein the inorganic filler is an oxide, carbide, nitride, silicide or boride of boron, magnesium, aluminum, silicon, calcium, titanium, vanadium, chromium, manganese, zinc, zirconium, molybdenum, cadmium, tin, antimony, barium, tungsten, lead or bismuth, or a borate, phosphate or silicate of lithium, sodium, potassium, mangesium, calcium, or zinc, or mixtures of any of the foregoing, and the silicone resin is a silicone oil, silicone varnish or silicone rubber.

7. A metal substrate coated with the heat-resistant paint of claim 1 which has been baked thereon at a temperature of from 200° to 2,000° C.

8. A non-metallic substrate coated with the heat-resistant paint of claim 1 which has been been baked thereon at a temperature of 200° to 2,000° C.

* * * * *

UNITED STATES PATENT AND TRADEMARK OFFICE
CERTIFICATE OF CORRECTION

PATENT NO. : 4,929,507
DATED : May 29, 1990
INVENTOR(S) : YOSHIO NISHIHARA ET AL.

It is certified that error appears in the above-identified patent and that said Letters Patent is hereby corrected as shown below:

Column 8, line 16 (claim 1, line 3), "filter" should read --filler--;
        line 49 (claim 1, line 31), "filter" should read --filler--.
        line 56 (claim 2, line 1), "point" should read --paint--.

Signed and Sealed this

Twenty-third Day of July, 1991

*Attest:*

HARRY F. MANBECK, JR.

*Attesting Officer*     *Commissioner of Patents and Trademarks*